United States Patent Office 3,485,793
Patented Dec. 23, 1969

3,485,793
FLAME RETARDANT POLYOXYMETHYLENE
COMPOSITION
Warren Froemming Busse, Westover Hills, and Walter Martin Bruner, Greenville, Wilmington, Del., assignors to E. I. du Pont de Nemours and Company, Wilmington, Del., a corporation of Delaware
No Drawing. Filed Sept. 15, 1964, Ser. No. 396,725
Int. Cl. C08g 1/00, 51/00
U.S. Cl. 260—45.75
17 Claims

ABSTRACT OF THE DISCLOSURE

Flame retardant polyoxymethylene wherein the flame retardant nature is obtained by incorporating from 5 to 30% of an amine, ammonium or amidine phosphate and preferably also from 1 to 20% of a formaldehyde scavenger having the formula

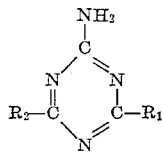

wherein $R_1$ and $R_2$ are —$NHR_3$ or —OH, and —$R_3$ is H or a lower alkyl radical of from 1–8 carbon atoms.

---

Polyoxymethylenes comprise an important class of high-strength structural molding and extrusion resins. However, polyoxymethylenes at present are quite flammable and, therefore, have limited uses in the building, appliance and electrical fields where plastics of low flammability may be required.

It has now been found that by adding certain compounds to polyoxymethylene a flame retardant or a self-extinguishing polyoxymethylene composition can be obtained.

The term "polyoxymethylene" as used herein refers to polymers which can be prepared by way of any one of several processes from any one of formaldehyde, trioxane or the higher aldehydes. Illustrative polyoxymethylenes and processes for their preparation are described in United States Patents 2,734,899 issued Feb. 14, 1956 to F. C. Starr, Jr.,
2,768,994 issued Oct. 30, 1956 to R. N. MacDonald,
2,795,571 issued June 11, 1957 to A. K. Schneider,
2,828,286 issued Mar. 25, 1958 to R. N. MacDonald,
2,841,570 issued July 1, 1958 to R. N. MacDonald,
2,844,561 issued July 22, 1958 to M. F. Bechtold et al.,
2,848,437 issued Aug. 19, 1958 to W. P. Langsdorf et al.,
2,994,687 issued Aug. 1, 1961 to H. H. Goodman et al.,
3,000,860 issued Sept. 19, 1961 to N. Brown et al.,
3,000,861, issued Sept. 19, 1961 to N. Brown et al.

One variety of polyoxymethylene, i.e., polyoxymethylene dicarboxylates, can be prepared by the processes described and claimed in United States Patents 2,998,409 issued Aug. 29, 1961 to Stephen Dal Nogare and John O. Punderson, and 2,964,500 issued Dec. 31, 1960 to Sidney H. Jenkins and John O. Punderson. Polyoxymethylene diethers can be prepared by the process described and claimed in copending patent applications Ser. No. 682,325, filed Sept. 6, 1957 by N. Brown et al., now U.S. Patent 3,161,616, granted Dec. 15, 1964, and Ser. No. 785,136, filed Jan. 6, 1959 by N. Brown et al., now U.S. Patent 3,192,182 granted June 29, 1965. Included within the term polyoxymethylene, for purposes of this application, are copolymers containing a predominance of oxymethylene groups, such as those prepared by the techniques set forth in United States Patents 2,828,287 issued Mar. 25, 1958 to Theodore L. Cairns et al., 3,027,352 issued Mar. 27, 1962 to Cheves T. Walling et al. which shows a copolymer containing 85 to 99.9 mol percent recurring oxymethylene groups and correspondingly 15 to 0.1 mol percent of recurring oxyalkylene groups having at least 2 carbon atoms and 3,076,786 issued Feb. 5, 1963 to N. Brown et al., and in copending applications Ser. No. 35,420, filed June 13, 1960 by N. Brown et al., now U.S. Patent 3,194,790 granted July 13, 1965, Ser. No. 51,294, filed Aug. 23, 1960 by E. T. Cline et al. now abandoned and Ser. No. 91,318, filed Feb. 24, 1961 by E. T. Cline, now U.S. Patent 3,218,295, granted Nov. 16, 1965.

It is an object of this invention to obtain polyoxymethylene compositions which are flame retardant or self-extinguishing, but which retain a substantial amount of the strength of normal polyoxymethylene, and which compositions have sufficient thermal stability to be extruded or injection molded.

This and other objects are accomplished by the following invention, which involves adding to a polyoxymethylene, an amine phosphate such as ethylene diamine phosphate, piperidine phosphate, or pyridine phosphate, or an ammonium or amidine salt of a mono- or polyphosphoric acid or phosphonamide. The polyoxymethylene can also contain conventional stabilizers, fillers, anti-oxidants, colorants and the like.

When common flame retardants such as trisdichloropropyl phosphate, dichloropropyl-dihydrogen phosphate, or chlorinated paraffin wax plus antimony trioxide are added to polyoxymethylene, the effect often is to make the polymer burn faster than without the additives. This is believed to be due to a catalytic effect of the acid phosphate or the halide groups on the decomposition of polyoxymethylene by means of an "unzipping" reaction to give free formaldehyde. This free formaldehyde is highly flammable and more than balances any flame extinguishing action the additive may have. Strongly alkaline compounds may also promote the evolution of formaldehyde by the pyrolysis of acyl end groups on the polyoxymethylene chains or by other means.

The additives of this invention modify the pyrolysis process of the polyoxymethylene to reduce the relative amounts of formaldehyde given off by unzipping and other reactions, and increase the amounts of non-flammable carbon dioxide, or water vapor, or slower burning carbon monoxide, or other gases and free carbon formed by competing reactions. We prefer additives which reduce the concentration of formaldehyde in the gases evolved at 200–300° C. to 70% or less, with corresponding changes (increases) in the concentrations of the less flammable gases. Even when the concentration of these gases is too small to make their mixtures with formaldehyde non-flammable, the gases will modify the combustion reactions of formaldehyde to give a large, yellow flame, instead of a small tightly fitting blue flame. This reduces the rate of heat transfer back to the solid polymer and thus reduces the heat available to pyrolyze more polymer to volatile fuel. In addition, the free carbon that is formed as a char on the surface of the polymer acts as a further barrier to the heat, and thus reduces the rate of generation of volatile fuel to feed the flames.

Phosphoric acid is known to be effective in promoting the pyrolysis of cellulose and polymethyl methacrylate to carbonaceous chars, and to reduce the amount of volatile flammable products that are evolved. However, acids also catalyze the breaking and the "unzipping" of the polyoxymethylene chains to evolve formaldehyde and may decompose the polyoxymethylene to a foam during extruding or molding ope rations. Strong bases hasten the degradation of chains that are broken by heat or by oxidation or by other means. It has now been found that these acid or base catalyzed reactions can be avoided, or minimized, and the desirable condensation reactions of the phosphoric acids retained by using certain nitrogen containing derivatives of phosphoric acid. The addition of smaller amounts of other materials to act as buffering agents or formaldehyde scavenging agents further improves the composition.

The acidity or basicity of the additive in the polyoxymethylene at processing and pyrolysis temperature may determine its self-extinguishing or degradation effects but these values cannot be measured under normal burning conditions. However, we find that in general, these nitrogen containing phosphates that have a pH from 4 to 10 or preferably from 5 to 8 in 1% aqueous solutions are effective.

If the original polymer begins to unzip to formaldehyde at an excessive rate when heated to a temperature of above 300° C., for instance, then the modified reactions to form carbon dioxide, water vapor, carbon monoxide, carbon, etc., will have to occur at some lower temperature, such as perhaps 280° C. or below in order to be effective. But the same additive system that caused char formation and carbon dioxide and water vapor evolution at 280° C. would not be effective if the original polyoxymethylene underwent excessive unzipping to formaldehyde at 260° C. Likewise, the added agents, and the mixture of these agents with the polyoxymethylene must be stable up to the processing temperature used to extrude, mold, or otherwise shape the material. The specific range of acidity that can be tolerated by the polymer generally depends among other things on the end groups on the polyoxymethylene chains. Ester groups may be split by additives which are too alkaline, leaving uncapped chains which have a strong tendency to "unzip." This may be reduced by introducing groups which put C—C linkages in the main chain. Alkyl capped chains are more stable to alkaline conditions than are ester capped chains, and, therefore, will tolerate more basic additives.

The pyrolysis modifying agents that have been found useful in reducing the flammability of polyoxymethylene include amidine phosphates, amine phosphates, and phosphonamides. Some amine phosphates are so stable that they tend to act as inert fillers in the polyoxymethylene. Suitable compounds which are believed to dissociate in the proper temperature range and which have been found to be effective flame retardants include monoguanidine phosphate, diguanidine phosphate, aminoguanidine phosphate, melamine phosphate, ethylenediamine phosphate, and the ammonium salts of polyphosphonamides described in United States Patent No. 2,122,122. The phosphate is preferably added in an amount of from 5 to 30% based on the resin; with from 10 to 20% based on the resin being the especially preferred range.

The decomposition of polyoxymethylene to formaldehyde can be autocatalytic. Therefore, the addition of compounds which react with, or scavenge the initial traces of formaldehyde can increase the effectiveness of these systems. Likewise, materials which buffer the system to an optimum pH range can be beneficial. Among the stable formaldehyde scavenging compounds which have been found effective are amines having the formula

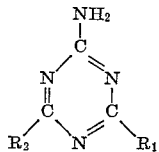

wherein $R_1$ and $R_2$ are selected from the class consisting of —$NHR_3$ and —OH, wherein —$R_3$ is selected from the class consisting of hydrogen and lower alkyl radicals having from 1 to 8 carbon atoms. Quantities of from 1 to 20% based on the resin of these amines may be used, but amounts of from 3 to 10% based on the polyoxymethylene resin are preferred.

It has been found that the reaction of melamine with formaldehyde or polyoxymethylene chain fragments apparently is catalyzed by small amounts of finely divided metal such as copper or zinc. By incorporating from 0.1% to 3.0% based on the resin of such metal in the mixture, the amounts of other additives can be reduced while still retaining the same level of non-flammability.

In carrying out this invention, the ingredients preferably should be mixed with the polyoxymethylene in the absence of substantial amounts of air. This can be done in an internal mixer where the polymer can be blanketed with nitrogen, or in an extruder, or in an injection molding machine equipped with a rotating torpedo.

The compositions described in Tables I, II and III were made by either of two methods. Method A, which was used for the data reported in Table III, involved mixing a 25 to 30 gram batch in a small internal mixer under nitrogen while maintaining the wall temperature between 190 and 200° C. The polyoxymethylene was placed in the mixer in the form of granules, warmed for five minutes, mixed for two minutes to get a melted mass, and the other ingredients were added as finely divided powders and mixed for eight minutes. The sample was then removed and compression molded into bars 5″ long by ½″ wide by ⅛″ thick.

Method B, which was used for the data reported in Tables I and II, involved dry blending finely powdered polyoxymethylene together with the other ingredients, and then putting the thus obtained blend in a 1.0 ounce injection molding machine equipped with a rotating torpedo. The cylinder wall temperatures were maintained between about 170 and 180° C. and mold temperatures of from 25 to 75° C. were used. The molding cycle was: load, stir under pressure for 60 seconds, inject 5.0 in. by 0.5 in. by 0.125 in. bars for 30 seconds.

The flammability of the samples, as reported in Table I, was measured by ASTM method D635–56T and involves igniting the end of a horizontal bar such as those prepared above, for 30 seconds with a Bunsen burner and noting the time of burning and distance traveled before the flame goes out, or the rate of burning. In this ASTM method, a screen is put under the bar to catch any polymer which drips off; and keeps it near the burning bar. The screen could be omitted in our tests, since our flame retarders caused the bars to char rather than drip when heated. If the flame goes out before burning to the one inch mark, it is self-extinguishing, extent zero. The extent of burning is, by definition, the distance the flame travels beyond the one inch mark. If the flame burns to the four inch mark, it is rated as burning. However, if it goes out at the four inch mark, it is self-extinguishing, extent of burning three inches.

The flame blowout results reported in Table II were obtained by igniting a test bar measuring 5″ x ½″ x ⅛′ for 30 seconds on one end with a ⅜″ I.D. Bunsen burner. After 30 seconds, the flame is removed and a stream of air is directed at the burning bar and the air velocity is increased gradually until the flame is extinguished. In these tests, the burning samples were placed 36 inches from a 0.142 I.D. nozzle. The velocity of the air in feet per minute is measured at the sample. Control samples were extinguished at from about 1200 to 1400 f.p.m. air flow. Reduced air flow to extinguish the flame on the sample indicates reduced flammability. Compositions which reduce the blowout velocity to ⅔ the velocity of the control sample are considered flame retardant. As can be seen, this means that the blowout velocity for preferred flame retardant compositions is below about 800 feet per minute.

In Tables I and II under the heading "Polyoxymethylene" A refers to a polyoxymethylene copolymer containing about 1.5 mole percent of oxyethylene groups in the chain. B refers to a stabilized homopolymer of formaldehyde. In Table I "$NH_3+P_2O_5$" represents an ammonium salt of amidopolyphosphate sold as "Victamide," and described in U.S. Patent No. 2,122,122. The analysis of this material yields 76.1 percent, $P_2O_5$, 15.4 percent free $NH_3$, 22.4 percent total $NH_3$, and 7 percent amide N (as $NH_3$).

All of the examples reported in Table I were self-extinguishing except Example 15 which was close to being self-extinguishing. The examples reported in Table II show compositions that have either reduced flammability or are self-extinguishing.

It should be noted that these pyrolyses were done in the absence of oxygen, and at a relatively slow rate, so they are not strictly comparable to the pyrolysis of a flame. However, they do give some indication of the difference in the pyrolysis reactions with and without some of the flame retardant additives.

Other data show that commercial polyoxymethylenes

TABLE I

| Example | Polyoxymethylene | Phosphate Wt. percent | Phosphate Compound | Scavenging agent Wt. percent | Scavenging agent Compound | Extent of burning, inches | Processing temperature, °C. |
|---|---|---|---|---|---|---|---|
| 1 | A | 15 | $NH_3+P_2O_5$ | 5 | Melamine | 0 | 180 |
| 2 | B | 15 | $(NH_4)_2HPO_4$ | 5 | ___do___ | 0 | 185 |
| 3 | A | 19 | $(NH_4)_2HPO_4$ | 5 | ___do___ | 0 | 185 |
| 4 | B | 15 | Monoguanidine phosphate | 5 | ___do___ | 0 | 175 |
| 5 | B | 20 | $NH_3+P_2O_5$ | 5 | ___do___ | 1.2 | 185 |
| 6 | B | 15 | $NH_3+P_2O_5$ | 5 | ___do___ | 0 | 185 |
| 7 | B | 15 | $(NH_4)_2HPO_4$ | 5 | Ammeline | 0 | 175 |
| 8 | A | 20 | Diguanidine phosphate | 0 | | 0 | 185 |
| 9 | A | 25 | $(NH_4)_2HPO_4$ | 0 | | 0 | 175 |
| 10 | A | 15 | $(NH_4)_2HPO_4$ | 5 | N,N-diallylmelamine | 0.2 | 175 |
| 11 | A | 20 | $(NH_4)_2HPO_4$ | 0 | | 0.3 | 175 |
| 12 | A | 25 | $NH_3+P_2O_5$ | 0 | | 1.0 | 185 |
| 13 | B | 20 | Diguanidine phosphate | 0 | | 2.4 | 185 |
| 14 | A | 15 | Ethylenediamine phosphate | 5 | Melamine | 4 | 185 |
| 15 | B | 10 | $NH_3+P_2O_5$ | 5 / 0.1 | Melamine / Copper | 0 | 185 |
| 16 | B | 15 | $NH_3+P_2O_5$ | 5 / 0.1 | Melamine / Copper | 0 | 185 |

TABLE II

| Example | Polyoxymethylene | Phosphate Wt. percent | Phosphate Compound | Scavenging agent Wt. percent | Scavenging agent Compound | Flame blow-out velocity, f.p.m. | Processing temperature °C. |
|---|---|---|---|---|---|---|---|
| 17 | A | 0 | | 0 | | 1,400 | 180 |
| 18 | B | 0 | | 0 | | 1,300 | 185 |
| 19 | A | 20 | Aminoguanidine phosphate | 0 | | 360 | 175 |
| 20 | A | 10 | $(NH_4)_2HPO_4$ | 10 | Melamine | 240 | 175 |
| 21 | A | 5 | $(NH_4)_2HPO_4$ | 15 | ___do___ | 640 | 175 |
| 22 | A | 20 | Melamine pyrophosphate | 0 | | 600 | 175 |
| 23 | A | 15 | Piperadine phosphate | 5 | Melamine | 520 | 175 |
| 24 | A | 20 | $(NH_4)_2HPO_4$ | 0 | ___do___ | 260 | 175 |
| 25 | A | 15 | $(NH_4)_2HPO_4$ | 0 | ___do___ | 600 | 175 |
| 26 | A | 15 | $(NH_4)_2HPO_4$ | 5 | N,N-diallyl melamine | 180 | 175 |
| 27 | A | 15 | $(NH_4)_2HPO_4$ | 5 | Benzoguanamine | 270 | 175 |
| 28 | A | 15 | $NH_3+P_2O_5$ | 0 | | 620 | 175 |
| 29 | A | 15 | $NH_3+P_2O_5$ | 5 | Melamine | 320 | 175 |
| 30 | B | 15 | $(NH_4)_2HPO_4$ | 5 | ___do___ | 37 | 185 |
| 31 | A | 20 | $NH_3+P_2O_5$ | 0 | | 550 | 185 |
| 32 | B | 20 | $NH_3+P_2O_5$ | 0 | | 580 | 185 |
| 33 | A | 15 | $(NH_4)_2HPO_4$ | 5 | N,N'-diphenyl benzidine | 270 | 185 |

Table III illustrates the difference in pyrolysis products between untreated polyoxymethylenes and the flame retardant polyoxymethylenes of this invention. The results reported in Table III are based on mass spectrograph analysis of the gases evolved from certain compositions. The gases were collected in 3 or 4 successive cuts after heating in a vacuum, the conditions being:

Cut (1) from room temperature to 200° C.;
Cut (2) 200° C. to 300° C.;
Cut (3) 15 minutes at 300° C.; and
Cut (4) 10 minutes additional at 300° C.

pyrolyze 50% in 15 minutes at about 270 to 275° C. The flame retardant polyoxymethylene compositions of the present invention pyrolyze 50% at about 240° C. Therefore, in Table III, the cut taken from 200 to 300° C. or cut 2, is probably the most significant. As can be seen from Table III about 95% of the pyrolysis products of virgin polyoxymethylene is formaldehyde (Examples 34 and 37, cut 2 in each case), while in the case of the flame retardant compositions the percent of formaldehyde in cut 2 is below about 40%. In the flame retardant compositions, the amounts of $H_2O$, $CO_2$ and CO are higher in cuts 2 and 3 than is the case with the conventional polyoxymethylene.

TABLE III

| Example No. | Polymer | Cut | HCHO | $H_2O$ | $CO_2$ | CO | Other |
|---|---|---|---|---|---|---|---|
| 34 | B | 1 | 76.7 | 18.1 | 2.3 | | 2.8 |
| | | 2 | 96.4 | 0.3 | 1.5 | | 1.8 |
| | | 3 | 97.8 | 0.2 | 0.5 | | |
| 35 | B+5% melamine+15% $NH_3+P_2O_5$ | 1 | 71.4 | 23.1 | 0.8 | 2.6 | 1.7 |
| | | 2 | 16.5 | 8.4 | 23.7 | 38.9 | 7.2 |
| | | 3 | 51.9 | 8.9 | 35.3 | 1.4 | 1.6 |
| 36 | B+5% melamine+15% $(NH_4)_2HPO_4$ | 1 | 95.2 | 1.2 | 0.4 | 1.7 | 11.4 |
| | | 2 | 24.4 | 8 | 32 | 24.1 | 3.6 |
| | | 3 | 29.4 | 10.3 | 55.5 | 0.8 | 2 |
| 37 | A | 1 | 13.2 | 84.5 | 2.3 | | |
| | | 2 | 94.6 | 4.7 | 0.7 | | |
| | | 3 | 97.7 | 1.1 | 1.2 | | |
| | | 4 | 98.7 | 0.7 | 0.6 | | |
| 38 | (128-2)A+ % melamine+ % $NH_3+P_2O_5$. | 1 | 2.8 | 92 | 2.9 | 2.3 | |
| | | 2 | 30.9 | 24 | 15.2 | 29.9 | |
| | | 3 | 65 | 4.2 | 29.8 | 1 | |
| | | 4 | 69.2 | 5.3 | 23.2 | 2.3 | |
| 39 | A+20% diguanidine phosphate. | 1 | 23.1 | 53.6 | 22.4 | 0.8 | 0.1 |
| | | 2 | 1.1 | 3.3 | 29.9 | 44.8 | 19.4 |
| | | 3 | 31.5 | 10.1 | 40.7 | 11.9 | 5.8 |
| 40 | B+20% $NH_3+P_2O_5$ | 1 | 15.2 | 4.9 | 19.7 | 56.7 | 3.5 |
| | | 2 | 38.9 | 18.2 | 4.1 | 30.3 | 8.5 |
| | | 3 | 58.5 | 23.1 | 4.7 | 10.5 | 3.2 |
| 41 | B+20% diguanidine phosphate. | 1 | 11.3 | 44.6 | 36.9 | 4.3 | 2.9 |
| | | 2 | 10 | 5.9 | 34.7 | 29.7 | 19.7 |
| | | 3 | 44.3 | 13.7 | 36.8 | 1.2 | 3.9 |

Pyrolysis tests were run on compositions that had been mixed in an extruder or internal mixer. One gram samples were put in an aluminum boat in a tubular furnace, such as may be used for combustion analyses. The samples were put in the furnace at a given temperature and kept there for 15 minutes, with a stream of 800 cc. per minute of air passing through the furnace. The weight of sample remaining after this treatment was determined. Typical results are shown in the following tables. The pyrolysis temperature is defined as the temperature at which there is 50% residue after this treatment.

TABLE IV.—PYROLYSES TEMPERATURES (°C.) REQUIRED TO LEAVE VARIOUS RESIDUES

| Percent Residue | Polymer C | Polymer D | Polymer E | Polymer F |
|---|---|---|---|---|
| 98 | 238 | 218 | 250 | 200 |
| 95 | 246 | 226 | 254 | 204 |
| 90 | 252 | 233 | 259 | 210 |
| 70 | 268 | 240 | 270 | 225 |
| 50 | 276 | 241 | 275 | 232 |
| Flammability | Burns | S.E. | Burns | S.E. |

Polymer C=Polyoxymethylene+1.5% oxyethylene + stabilizers.
Polymer D=Polymer A+5% melamine+15% $P_2O_5$+$NH_3$.
Polymer E=Alkyl capped formaldehyde homopolymer+stabilizer.
Polymer F=Polymer E+20% diguanidine phosphate.
S.E.=Self extinguishing.

The flame retardant compositions of this invention can be made with tensile strengths of from 50 to 80 percent of the strength unmodified polyoxymethylene resin used in the composition. The tensile modulus of the self-extinguishing compositions are higher than the modulus of the unmodified polyoxymethylene resin used in the composition. The strengths obtained with some of these compositions are reported in Table V.

TABLE V

| Composition | Tensile strength p.s.i. | Tensile modulus, p.s.i. |
|---|---|---|
| B of Table I (control) | 9,780 | 460,000 |
| B +15% $NH_3$+$P_2O_5$ +5% melamine | 5,990 | 586,000 |
| B +15% $(NH_4)_2HPO_4$ +5% melamine | 6,670 | 637,000 |
| A of Table I (control) | 7,630 | 419,000 |
| A +15% $(NH_4)_2HPO_4$+5% N,N'-diallyl melamine | 5,110 | 312,000 |

The flame retardant compositions of this invention are useful for molding electrical boxes, cover plates, housings for electrically operated tools, electrical cable conduits and the like.

I claim:
1. A flame retardant composition comprising a polyoxymethylene resin and from 5 to 30 weight percent, based on said resin, of a compound selected from the class consisting of amine, ammonium, and amidine phosphates, which composition pyrolyses at a temperature at least 20° C. below the pyrolysis temperature of the polyoxymethylene resin, and forms a char on heating in a flame.

2. The composition of claim 1 wherein the phosphate is present in an amount of from 10 to 25 weight percent based on the polyoxymethylene resin.

3. A flame retardant composition comprising a polyoxymethylene resin, from 5 to 30 weight percent, based on said resin, of a compound selected from the class consisting of amine, ammonium and amidine phosphates, and from 1 to 20 weight percent of a stable formaldehyde scavenging compound having the formula

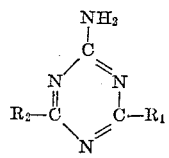

wherein $R_1$ and $R_2$ are selected from the class consisting of —$NHR_3$ and —OH, wherein —$R_3$ is a monovalent radical selected from the class consisting of hydrogen and lower alkyl radicals having from 1 to 8 carbon atoms, which composition pyrolyses at a temperature at least 20° C. below the pyrolysis temperature of the polyoxymethylene resin, and forms a char on heating in a flame.

4. The composition of claim 3 wherein the phosphate is present in an amount of from 10 to 20 weight percent based on the polyoxymethylene resin.

5. The composition of claim 4 wherein the stable formaldehyde scavenging compound is present in an amount of from 3 to 10 weight percent based on the resin.

6. A flame retardant composition comprising a polyoxymethylene resin and from 5 to 30 weight percent, based on said resin, of a compound selected from the class consisting of amine, ammonium and amidine phosphates, which composition pyrolyses at a temperature at least 20° C. below the pyrolysis temperature of the polyoxymethylene resin, and which composition upon being heated to 300° C. in vacuum forms gaseous pyrolysis products containing less than 70 percent formaldehyde and forms a char on heating in a flame.

7. The composition of claim 6 wherein the phosphate is present in an amount of from 10 to 20 weight percent based on the polyoxymethylene resin.

8. A flame retardant composition comprising a polyoxymethylene resin, from 5 to 30 weight percent, based on said resin, of a compound selected from the class consisting of amine, ammonium and amidine phosphates, and from 1 to 20 weight percent of a stable formaldehyde scavenging compound having the formula

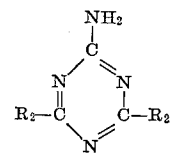

wherein $R_1$ and $R_2$ are selected from the class consisting of —$NHR_3$ and —OH, wherein —$R_3$ is a monovalent radical selected from the class consisting of hydrogen and lower alkyl radicals having from 1 to 8 carbon atoms, which composition pyrolyses at a temperature at least 20° C. below the pyrolysis temperature of the polyoxymethylene resin, and which composition upon being heated to 300° C. gives less than 70 percent formaldehyde in the gaseous pyrolysis products and forms a char on heating in a flame.

9. The composition of claim 8 wherein the phosphate is present in an amount of from 10 to 20 weight percent based on the polyoxymethylene resin.

10. The composition of claim 9 wherein the stable formaldehyde scavenging compound is present in an amount of from 3 to 10 weight percent based on the resin.

11. The composition of claim 8 wherein from 0.1 to 2.0 percent, based on the resin, of copper metal is incorporated in the composition.

12. The composition of claim 10 wherein from 0.1 to 2.0 percent, based on the resin, of copper metal is incorporated in the composition.

13. The composition of claim 1 wherein the phosphate is an ammonium phosphate.

14. The composition of claim 1 wherein the phosphate is an amidine phosphate.

15. The composition of claim 3 wherein the phosphate is an ammonium phosphate.

16. The composition of claim 3 wherein the phosphate is an amidine phosphate.

17. A composition comprising (a) a polyoxymethylene resin selected from the group consisting of an oxymethylene homopolymer and a copolymer having 85 to 99.9 mol percent of recurring oxymethylene groups and correspondingly 15 to .1 mol percent of recurring oxyalkylene groups having at least 2 carbon atoms, and (b) an ammonium phosphate in a flame-retardant amount.

References Cited

UNITED STATES PATENTS

| | | | |
|---|---|---|---|
| 2,106,938 | 2/1938 | Tramm et al. | |
| 3,027,352 | 3/1962 | Walling et al. | 260—67 |
| 2,582,961 | 1/1952 | Burnell et al. | 260—849 |
| 2,681,326 | 6/1954 | Christianson | 260—849 |

FOREIGN PATENTS 831,925   4/1960   Great Britian.

WILLIAM H. SHORT, Primary Examiner

L. M. PHYNES, Assistant Examiner

U.S. Cl. X.R.

260—45.8, 45.9, 67

PO-1050
(5/69)

UNITED STATES PATENT OFFICE
CERTIFICATE OF CORRECTION

Patent No. 3,485,793            Dated  December 23, 1969

Inventor(s) Warren Froemming BUSSE and Walter Martin BRUNER

It is certified that error appears in the above-identified patent and that said Letters Patent are hereby corrected as shown below:

Col. 5, Table I under "Wt. percent", Example 12 should be -- 20 -- instead of "25";

Table II, Examples 24 and 25 under "Scavenging agent" "Compound" should be blank.

Col. 8, Claim 5, line 2, "scavening" should read -- scavenging.
      Claim 8, line 32, "scavening" should read -- scavenging

SIGNED AND
SEALED
OCT 20 1970

(SEAL)
Attest:

Edward M. Fletcher, Jr.
Attesting Officer

WILLIAM E. SCHUYLER, JR.
Commissioner of Patents